(12) United States Patent
Jaber et al.

(10) Patent No.: US 11,358,102 B2
(45) Date of Patent: Jun. 14, 2022

(54) AGAROSE ULTRAFILTRATION MEMBRANE COMPOSITES FOR SIZE BASED SEPARATIONS

(71) Applicant: EMD Millipore Corporation, Burlington, MA (US)

(72) Inventors: Jad Jaber, Sudbury, MA (US); Wilson Moya, Burlington, MA (US); Mikhail Kozlov, Lexington, MA (US)

(73) Assignee: EMD Millipore Corporation, Burlington, MA (US)

(*) Notice: Subject to any disclaimer, the term of this patent is extended or adjusted under 35 U.S.C. 154(b) by 86 days.

(21) Appl. No.: 16/918,431

(22) Filed: Jul. 1, 2020

(65) Prior Publication Data

US 2020/0368696 A1 Nov. 26, 2020

Related U.S. Application Data

(62) Division of application No. 15/575,596, filed as application No. PCT/US2016/046665 on Aug. 12, 2016, now Pat. No. 10,737,224.

(60) Provisional application No. 62/205,859, filed on Aug. 17, 2015, provisional application No. 62/268,220, filed on Dec. 16, 2015.

(51) Int. Cl.
| | |
|---|---|
| *B01D 61/14* | (2006.01) |
| *B01D 67/00* | (2006.01) |
| *B01D 69/12* | (2006.01) |
| *B01D 69/02* | (2006.01) |
| *B01D 69/10* | (2006.01) |
| *B01D 71/08* | (2006.01) |

(52) U.S. Cl.
CPC ........... *B01D 71/08* (2013.01); *B01D 61/145* (2013.01); *B01D 67/0006* (2013.01); *B01D 67/0011* (2013.01); *B01D 67/0013* (2013.01); *B01D 67/0016* (2013.01); *B01D 69/02* (2013.01); *B01D 69/10* (2013.01); *B01D 69/125* (2013.01); *B01D 2323/30* (2013.01); *B01D 2325/02* (2013.01); *B01D 2325/04* (2013.01); *B01D 2325/36* (2013.01)

(58) Field of Classification Search
CPC .... B01D 61/145; B01D 69/125; B01D 71/08; B01D 2323/30
See application file for complete search history.

(56) References Cited

U.S. PATENT DOCUMENTS

| | | | |
|---|---|---|---|
| 3,527,712 A | 9/1970 | Renn et al. | |
| 3,912,834 A | 10/1975 | Imai et al. | |
| 4,591,640 A | 5/1986 | Hjerten | |
| 4,647,536 A | 3/1987 | Mosbach et al. | |
| 4,778,601 A | 10/1988 | Lopatin et al. | |
| 5,736,044 A | 4/1998 | Proulx et al. | |
| 2001/0041795 A1 | 11/2001 | Halaka | |
| 2004/0175788 A1 | 9/2004 | Galaev et al. | |
| 2005/0009994 A1 | 1/2005 | Solomon et al. | |
| 2005/0191426 A1* | 9/2005 | Moya | B01J 20/3282 427/372.2 |
| 2008/0154031 A1 | 6/2008 | Berg et al. | |
| 2011/0217539 A1 | 9/2011 | Bonner et al. | |
| 2015/0321146 A1 | 11/2015 | Lin et al. | |

FOREIGN PATENT DOCUMENTS

| | | |
|---|---|---|
| CN | 101612528 A | 12/2009 |
| CN | 103551054 A | 2/2014 |
| EP | 2163296 A1 | 3/2010 |
| EP | 1775016 B1 | 3/2013 |
| JP | 2001-129373 A | 5/2001 |
| KR | 10-1326438 B1 | 11/2013 |
| WO | 96/20040 A1 | 7/1996 |
| WO | 2005/077500 A1 | 8/2005 |
| WO | 2010/096704 A2 | 8/2010 |
| WO | 2017/030923 A1 | 2/2017 |

OTHER PUBLICATIONS

Shouwu et al., "Modification of Polymer Materials—Principle and Technology", Intellectual Property Publishing House, 1st Edition, May 31, 2015, 4 pages (1 page of English Translation and 3 pages of Official Copy).
Wutong et al., "Biopharmaceutical Technology", China Medical Science Press, 1st Edition, Feb. 29, 2004, 10 pages (1 page of English Translation and 9 pages of Official Copy).
Zhenyu et al., "Separation Technology of Bioactive Components", Harbin Institute of Technology Press, 1st Edition, May 31, 2015, 8 pages (1 page of English Translation and 7 pages of Official Copy).
Bengtsson et al., "Chromatography of Animal Viruses on Pearl-Condensed Agar", Biochimica et Biophysica Acta (BBA), vol. 79, Issue 2, Mar. 30, 1964, pp. 399-406.
Hjerten, Stellan, "The Preparation of Agarose Spheres for Chromatography of Molecules and Particles", Biochimica et Biophysica Acta, vol. 79, No. 2, Mar. 30, 1964, pp. 393-398.
Koros et al., "Terminology for membranes and membrane processes", International Union of Pure and Applied Chemistry (IUPAC), 1996, pp. 1479-1489.
Nilsson et al., "Entrapment of Animal Cells", Methods in Enzymology, Academic Press, vol. 135, Part B, 1987, pp. 399-410.
International Preliminary Report on Patentability for PCT Application No. PCT/US2016/046665, dated Mar. 1, 2018, Mar. 1, 2018, 8 pages.
International Search Report and Written Opinion received for PCT Application No. PCT/US2016/046665, dated Nov. 22, 2016, 10 pages.
Tkacik et al., "A Rejection Profile Test for Ultrafiltration Membranes and Devices", Biotechnology, vol. 9, Oct. 1, 1991, pp. 941-943.

(Continued)

*Primary Examiner* — Bradley R Spies
(74) *Attorney, Agent, or Firm* — EMD Millipore Corporation

(57) ABSTRACT

The embodiments described herein relate to agarose ultrafiltration membrane composites and methods for making and using the same.

11 Claims, 9 Drawing Sheets

(56) References Cited

OTHER PUBLICATIONS

Yoshikawa et al., "Pervaporation Separation of Aqueous Organic Mixtures Through Agarose Membranes", Journal of Membrane Science, vol. 205, Issues 1-2, Aug. 1, 2002, pp. 293-300.
Zeman et al., "Microfiltration and Ultrafiltration: Principles and Applications", Marcel Dekker, Inc., 1996, pp. 299-301.
Zeman et al., "Steric Rejection of Polymeric Solutes by Membranes with Uniform Pore Size Distribution", Separation Science and Technology, vol. 16, No. 3, Apr. 1981, pp. 275-290.

* cited by examiner

AGAROSE ULTRAFILTRATION MEMBRANE COMPOSITES FOR SIZE BASED SEPARATIONS

RELATED APPLICATIONS

This application is a Divisional of U.S. application Ser. No. 15/575,596 filed on Nov. 20, 2017, which is a US National Stage application of International Application No. PCT/US2016/046665, filed Aug. 12, 2016, which claim the benefit priority of U.S. Provisional Patent Application No. 62/268,220 filing date Dec. 16, 2015, and U.S. Provisional Patent Application No. 62/205,859, filing date Aug. 17, 2015, the disclosure of which is incorporated herein by reference in its entirety.

FIELD

The embodiments disclosed herein relate to novel ultrafiltration composite structures comprising an agarose layer on a porous support membrane and to methods for producing such ultrafiltration composite structures. Also described herein are methods of using such ultrafiltration composite structures, e.g., for removing viruses from a biopharmaceutical solution.

BACKGROUND

Ultrafiltration membranes are typically used in pressure-driven filtration processes. Viral removal membrane filters are increasingly used in the biotechnology industry to provide the needed safety of the manufactured therapeutic products. These filters are meant to retain a high proportion of viruses that may be present in a feed containing the therapeutic product, while the product flows through the membrane.

Ultrafiltration (UF) membranes are primarily used to concentrate or diafilter soluble macromolecules such as proteins, DNA, viruses, starches and natural or synthetic polymers. In the vast majority of applications, ultrafiltration is carried out in the tangential flow filtration (TFF) mode, where the feed solution is passed across the membrane surface and the molecules which are smaller than the pore size of the membrane pass through (filtrate) and the rest (retentate) remains on the upstream side of the membrane. As fluid passes through the membrane, there is a need to recycle or add to the retentate flow in order to maintain an efficient TFF operation. One advantage of using a TFF approach is that because the fluid constantly sweeps across the face of the membrane, it tends to reduce fouling and polarization of the solutes at and near the membrane surface leading to longer life of the membrane.

Ultrafiltration membranes are generally skinned asymmetric membranes, made for the most part on a support, which often remains a permanent part of the membrane structure. The support can be a non-woven fabric, or a preformed membrane. UF membranes are made by immersion casting methods and are skinned and asymmetric. The initial commercial applications were related to protein concentration and membranes were rated by the molecular weight of the protein that they would retain, i.e. the molecular weight cutoff rating of the membrane (MWCO).

While ultrafiltration membrane ratings based on testing with proteins is still performed, a common method uses non-protein macromolecules having a narrow molecular weight distribution, such as polysaccharides (Dextrans) or polyethylene glycols (see for example, "A rejection profile test for ultrafiltration membranes and devices", Biotechnology 9 (1991) 941-943).

a) Ultrafiltration membrane production methods by immersion casting are well known. A concise discussion is given in "Microfiltration and Ultrafiltration: Principles and Applications"; Marcel Dekker (1996); L. J. Zeman and A. J. Zydney, eds. An exemplary production method is described to consist of the following steps:
  a) preparation of a specific and well controlled polymer solution;
  b) casting the polymer solution in the form of a thin film onto a substrate;
  c) coagulating the resulting film of the polymer solution in a non-solvent; and
  d) optionally drying the ultrafiltration membrane.

Controlling pore size in ultrafiltration membranes is generally not straightforward. Not only the solid content of the casting solution has an impact on membrane porosity and pore size but also the relative rates at which non-solvent enters and solvent leaves the casting solution. If the non-solvent enters the film before the solvent leaves, the polymer precipitates around a larger volume of solvent (which acts as a pore former) resulting in high porosity and large pore size UF membrane. The opposite is true if the solvent leaves the film faster than non-solvent enters and the resulting UF membrane has lower porosity and smaller pores. Additives to the casting solution or non-solvent bath as well as temperature adjustment to both are often employed to control the relative rate of non-solvent entry and solvent removal from the cast film.

Agarose is a natural polysaccharide that has been used extensively to produce porous beads. These beads find numerous applications in chromatographic separations. The earliest art describing the formation of agarose beads (for chromatographic applications) used warm, non-aqueous solvents in which the agarose was emulsified before gel formation by cooling. See, for example, Hjerten, S. Biochim. Biophys. Acta 1964, 79:393-398; and Bengtsson et al., S. Biochim. Biophys. Acta 1964, 79:399. Another method for agarose bead formation, as disclosed in U.S. Pat. No. 4,647,536 is dropping an agarose emulsion into a cooled oil. Such a method is also disclosed in "Methods in Enzymology" Vol. 135 Part B, p. 401, Academic Press, 1987. The polymer must be heated above its melting temperature, which is about 92° C., and dissolved in the presence of water. At or above that temperature, the polymer melts and the molten polymer is then solvated by water to form a solution. The polymer remains soluble in water as long as the temperature is above the polymer's gel point, which is about 43° C. At and below the gel point, the polymer phase separates and becomes a hydrogel that takes on whatever shape the solution was just before gelling. Additionally, as the agarose approaches its gel point, the viscosity of the solution becomes higher and higher as the hydrogel begins to form.

Traditionally, for polysaccharide beads, such as are used in chromatography media, the heated solution is kept above its gel point and it is stirred into an immiscible, heated fluid, such as mineral or vegetable oil, to form beads. The two-phased material (beads of agarose in the immiscible fluid) is then cooled and the beads are recovered. The beads themselves are diffusionally porous and can then be used as made for size exclusion chromatography. Additionally, they can be further processed by crosslinking, addition of various capture chemistries such as affinity chemistries or ligands, positive or negative charge, hydrophobicity or the like or combinations of crosslinking and chemistries to enhance their capture capabilities.

Agarose has been used extensively to form porous beads, where the target product and/or impurities travel into and back out of the pores in a diffusion-driven process.

SUMMARY

The embodiments described herein relate to novel ultrafiltration composite structures which include agarose. While agarose beads can be found in the prior art, agarose has not been previously used to create continuous, flat porous structures that could be employed as filtration membranes, such that the target product and/or impurities travel into and through the pores in a pressure-driven process, as described herein.

The terms "agarose ultrafiltration composite structure" and "agarose ultrafiltration membrane composite" is used interchangeably herein. The terms "composite", "composite structures" and "membrane composites", as used interchangeably herein, describe multi-layered porous structures that contain at least one supporting porous membrane (also referred to as substrate) and a layer of porous agarose deposited on the membrane.

The ultrafiltration membrane composites described herein provide several advantages over ultrafiltration membranes that are currently available. Specifically, the ultrafiltration membrane composites described herein avoid the use of hazardous organic solvents during manufacturing process. This helps to make the manufacturing process simpler, safer, cheaper, and more environmentally friendly. In addition, there is no need to extract these solvents after membrane formation. The formation process is simplified due to fewer process steps and ability to easily control the pore size of the ultrafiltration membrane by manipulating agarose concentration. Further, the ultrafiltration membrane composites described herein exhibit low protein binding, stability under high pH conditions and also do not rely on the presence of extractable and/or releasable compositions to form a porous structure.

In some embodiments, the ultrafiltration membranes described herein are cellulosic in nature. In some embodiments, a method for making an agarose ultrafiltration membrane composite is provided, the method comprising the following steps: a) providing a porous support membrane (also referred to as substrate) having an average pore size ranging from 0.01 µm to 1 µm and an average thickness ranging from 10 µm to 500 µm, wherein the porous support membrane comprises a polymer selected from the group consisting of polyester, polyolefin, polyethylene (PE), polypropylene, polyamide, polyethylene terephthalate (PET), polyether-ether ketone (PEEK), polysulfone, polyethersulfone (PES), aromatic polymers and fluorinated polymers like polytetrafluoroethylene and polyvinylidene fluoride (PVDF); b) providing an agarose solution; c) casting a layer of agarose solution onto said porous support membrane at a temperature ranging from 20 to 90 C, thereby to form an agarose coated porous support membrane; and d) immersing the agarose coated porous support membrane into a water bath at a temperature below the gelling point of the agarose solution; thereby to form an agarose ultrafiltration membrane.

In some embodiments, the agarose ultrafiltration membrane composite has a pore size less than 0.1 µm. In some embodiments, the water bath comprises ice water.

The methods described herein are useful for the production of an agarose ultrafiltration membrane composite having a porous support, where the membrane composite has a molecular weight cutoff (MWCO) value of 10-1000 kDa (R90).

In some embodiments, the agarose ultrafiltration membrane composite comprises a porous support made from a polymer selected from the group consisting of polyvinylidene fluoride (PVDF), polyethylene (PE), and polyether sulfone (PES). In a particular embodiment, the porous support comprises polyvinylidene fluoride (PVDF) or ultra-high molecular weight polyethylene (UHMW-PE). In some embodiments according to the methods described herein, an agarose solution having a concentration of agarose ranging from 1-12 wt.-% is used. In other embodiments, an agarose solution having a concentration of agarose ranging from 5-11 wt.-% is used. In a particular embodiment, the method is performed by providing an agarose solution comprising $ZnCl_2$ as stabilizer at a concentration of up to 15 wt.-%.

In some embodiments described herein, a crosslinking agent is added to the agarose solution, thereby to stabilize the agarose layer under positive transmembrane pressure (TMP), which refers to pressure differential between the pressure above and below the membrane. Accordingly, in some embodiments, an agarose solution is used in the methods described herein which comprises a cross-linker or cross-linking agent at a concentration ranging from 0.01 wt.-% to 1 wt.-%. An exemplary cross-linking agent or cross linker is divinylsulfone (DVS). In some embodiments described herein, the agarose solution is heated to a temperature ranging from 20 to 90° C.; or ranging from 45 to 75° C. In a particular embodiment, the agarose solution is heated to a temperature of 70° C.

In some embodiments, the heated agarose solution is applied to a porous support membrane, as described herein, which is also heated, e.g., to a temperature ranging from 20 to 90° C.; or ranging from 45 to 75° C. In a particular embodiment, the porous support membrane is heated to a temperature of 70° C. The temperature at which the agarose solution and the support membrane are heated may be the same temperature or different temperatures.

Subsequent to applying the agarose solution onto the porous support membrane, the agarose coated porous support membrane is immersed in a water bath of a temperature less than the gelling point of the agarose solution. The gelling point of the agarose can be predetermined using known methods in the art and those described herein. It would be clear to one of ordinary skill in the art as to how to determine the gelling point of an agarose solution. In some embodiments, the water bath is cooled to a temperature below room temperature. In some embodiments, the temperature ranges from 5-60° C. In other embodiments, the temperature ranges from 10-40° C.

In some embodiments, the porous support membrane has an average thickness ranging from 100 µm to 200 µm and an average pore size of less than 0.2 µm. In some embodiments, the porous support membrane has a thickness ranging from 10 µm to 500 µm.

Methods described herein are useful for manufacturing an ultrafiltration membrane composite which comprises a layer of agarose on a porous support membrane. In some embodiments, the agarose layer penetrates or infiltrates into the porous support membrane, thereby resulting in a membrane composite which is highly resistant to delamination. It has been found that an infiltration depth of 1-15 µm leads to a membrane suitable for filtration and highly resistant to delamination.

The agarose ultrafiltration membrane composites described herein generally comprise an agarose layer having a thickness ranging from 1 μm to 100 μm; or ranging from 1 μm to 20 μm. In a particular embodiment, the thickness of the agarose layer ranges from 10 μm to 20 μm. In various embodiments, the agarose layer is deposited onto a porous support membrane. In some embodiments, the deposition of the agarose layer on the porous support membrane comprises penetration or infiltration of agarose solution into the underlying porous support membrane, gelling and subsequent solidification of the agarose solution by cooling.

In some embodiments, the porous support membrane is a woven or non-woven fabric made from a polymer selected from the group consisting of polyester, polyolefins, polyethylene (PE), polypropylene, polyethylene terephthalate (PET), polyether-ether ketone (PEEK), polyether sulfone (PES), and a fluorinated polymer, such as polytetrafluoroethylene or polyvinylidene fluoride (PVDF). In some embodiments, the porous support membrane consists of woven or non-woven polymer fibers made from a polymer selected from the group consisting of polyvinylidene fluoride (PVDF), polyethylene (PE), polyether sulfone (PES), polyethylene terephthalate (PET) and polyamides including polycaprolactam and poly(hexamethylene adipamide).

As evidenced by experimental data provided herein, ultrafiltration membrane composites described herein include a porous support membrane which has an average thickness of more than 10 μm. In some embodiments, ultrafiltration membrane composites described herein include a porous support membrane which has a thickness ranging from 20 μm to 500 μm. In a particular embodiment, the porous support membrane has an average thickness of 100 μm.

Also described herein are processes for using agarose ultrafiltration membrane composites described herein. In some embodiments, membrane composites described herein are useful for removing viral particles from a sample containing a protein of interest. In some embodiments, the protein of interest is a recombinant protein. In a particular embodiment, the protein of interest is a monoclonal antibody.

The membrane composites described herein can be used under normal flow filtration conditions or tangential flow filtration conditions and can be employed in such processes for purification and/or concentration of protein solutions. In some embodiments, membrane composites described herein are packaged in a suitable filtration device.

In various embodiments, the agarose ultrafiltration membrane composites described herein are used for size based separations. In some embodiments, the membrane composites described herein may be used for removal of virus or virus like particles from a solution containing a protein of interest, e.g., by size based separation or size exclusion.

BRIEF DESCRIPTION OF THE DRAWINGS

FIG. 1A depicts a setup (10) having a microporous substrate (20) (i.e., the porous support membrane) made of polyvinylidene fluoride (PVDF), which is placed on a hot or heated plate (30) at 70° C. Agarose casting solution is poured onto the substrate (20) held by tape (40) on a glass plate (50). FIG. 1B depicts a set up (60) including a microporous substrate (PVDF) (i.e., the porous support membrane) (20) placed on a hot or heated plate (30) at 70° C. and sandwiched between a shim (80) and a plastic sheet (70). The shim (80) is used to gap the micrometer adjustable knife (90) used to spread the agarose casting solution, but it is removed before the agarose casting solution is poured between the substrate (20) and plastic sheet (70), followed by using the gaped micrometer adjustable knife (90) to spread the agarose. The resulting agarose membrane composite is quickly detached from the hot plate and is contacted with ice for at least 2 minutes, followed by immersion in a water bath maintained at 20° C., where the plastic sheet (70) is carefully peeled off.

FIGS. 2A and 2B are cross sections showing the top and bottom of membrane composites respectively (i.e., interface of microporous substrate and agarose layer).

DETAILED DESCRIPTION

Figure 1A:
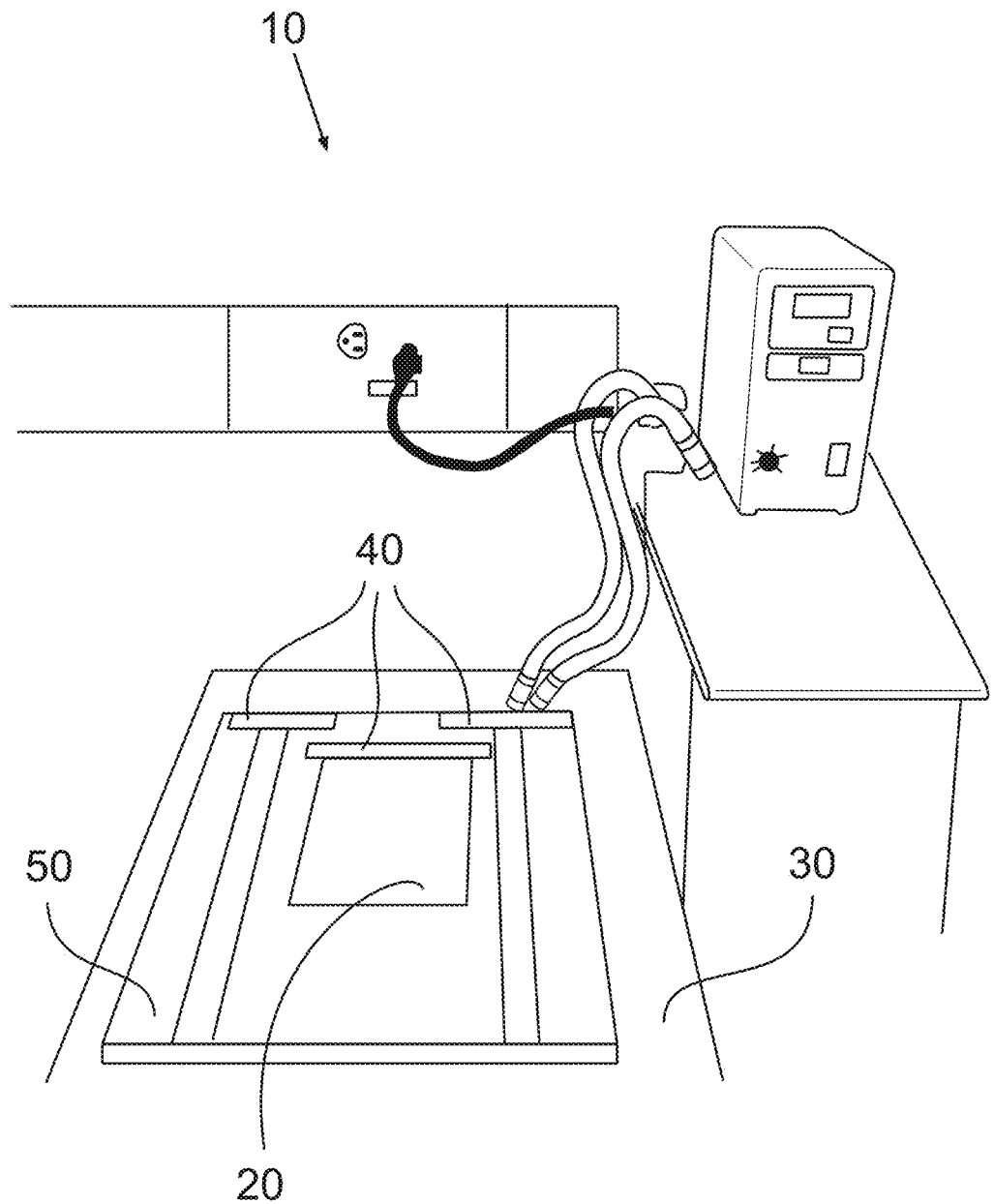
FIGS. 1A and 1B includes depictions of setups utilized for preparation of agarose membrane composites described herein.

The embodiments described herein relate to agarose ultrafiltration membrane composites and processes for making and using the same. Specifically, the ultrafiltration membrane composites described herein are produced by casting a layer of agarose solution onto a porous support membrane (also referred to as substrate). The agarose solution penetrates into the porous support membrane, thereby resulting in an agarose ultrafiltration membrane composite which is highly resistant to delamination.

The term "ultrafiltration membrane" or "UF membrane" as used herein, is based on the definition of the International Union of Pure and Applied Chemistry (IUPAC) terminology for membranes and membrane processes, published in Pure Appl. Chem., (1996), 68, 1479; according to which, microfiltration is defined as a pressure-driven membrane-based separation process in which particles and dissolved macromolecules larger than 0.1 μm are rejected, and ultrafiltration is defined as a pressure-driven membrane-based separation process in which particles and dissolved macromolecules smaller than 0.1 μm and larger than about 2 nm are rejected.

Accordingly, ultrafiltration membranes are defined as being capable of concentrating or diafiltering soluble macromolecules that have a size in solution of less than about 0.1 μm and are capable of operating continuously in a tangential flow mode for extended periods of time, usually more than 4 hours and for up to 24 hours. In contrast, microporous membranes are capable of removing particles larger than 0.1 μm and being used in dead-end filtration applications. Microporous membranes generally allow soluble macromolecules to pass through the membrane.

The methods described herein combine solution and thermal phase inversion techniques and eliminate the use of organic solvents in the casting solution or non-solvent bath. The methods described herein also allow for a more straightforward approach for controlling pore size. This is at least partially due to the fact that it is generally easier to control the pore size of agarose gels relative to gels of other compounds such as cross-linked dextrans or polyacrylamide gels. For example, according to U.S. Pat. No. 3,527,712 A, the pore size of agarose gel is dependent on the agarose concentration in the gel. It is known in the art that as the concentration of the agarose is decreased, the effective pore size of the gel increases. Therefore, depending on a particular concentration of agarose, it becomes possible to effect sorting of molecules having a molecular weight between 10 Da and 700 kDa. In order to process agarose, the agarose polymer must be heated above its melting temperature, which is about 92° C., in the presence of water. The polymer melts at that temperature and the molten polymer is then solvated by water to form a solution. The polymer remains soluble in water as long as the temperature is above the polymer's gel point, which is in the range of 20 to 43° C., depending on the type and concentration of agarose used. At and below the gel point, the polymer phase separates and becomes a hydrogel. Types of agarose used to prepare membrane composites described herein show gel points in the range of about 35 to 40° C., or in the range of 37 to 39° C.

In some embodiments, an agarose ultrafiltration membrane described herein is formed by passing a porous support membrane and a hot solution of agarose between two nip rolls formed by: (a) a heated stainless steel roll with or without a film thereon; and (b) a rotating cylinder.

The thickness of the agarose layer and the degree of penetration of the agarose into the porous support membrane is controlled by the solution pressure at entrance into the space between the nip rolls, the durometer (hardness) and diameter of the roll, solution viscosity and process speed.

In another embodiment, the agarose solution can be applied to the porous support membrane by a conventional knife-over-roll or slot die coating methods.

The porous support membrane is then contacted with a non-solvent for agarose, such as water, at or below its gelling temperature. In some embodiments, the agarose layer can be subjected to additional steps, such as crosslinking, chemical derivatization using functional chemistries and the like.

In yet other embodiments, an agarose ultrafiltration membrane composite is formed by spreading an agarose solution between a porous support membrane and a non-stick, non-polymeric sheet. Spreading of the agarose solution can be achieved any suitable means. Non-limiting examples include using a rubber roller or a bird knife, doctor blade or the like. The spreading step may be carried out on a hot plate with temperature above the gelling point of agarose solution, thereby to form an ultrafiltration layer over the entire surface along the width as well as the length of the porous support membrane using thermal phase inversion. The agarose coated porous support membrane is then contacted with water to prevent damaging the agarose layer while the non-stick polymeric sheet is removed, leaving behind a porous support membrane coated with a thin layer of agarose, which is in the ultrafiltration range. Optionally, the formed agarose layer can subsequently be subjected to additional steps such as crosslinking, chemical derivatization using functional chemistries and the like.

Porous support membranes, also referred to as substrates herein, which may be utilized for making the agarose ultrafiltration membrane composites described herein can be made from polymers such as polyethylene, polypropylene, polyether-ether ketone (PEEK), which can be used in the presence of various solvents, such as DMSO, DMF and NMP.

It is desirable for the porous support membranes or substrates to have porosity for flow, mechanical strength, flexibility and resistance to swelling or dissolution by organic solvents. Porous support membranes may comprise non-woven or woven fabrics, which are made from polymers such as polyester, polyamide, polycaprolactam, poly (hexamethylene adipamide), polyolefin, polyethylene (PE), polypropylene, aromatic polymers, polyethylene terephthalate (PET), polyether-ether ketone (PEEK), or fluorinated polymers such as polytetrafluoroethylene or polyvinylidene fluoride (PVDF), polysulfone or polyether sulfone (PES), halogenated polymers or fluorinated polymers like polytetrafluoroethylene or polyvinylidene fluoride (PVDF).

In some embodiments, porous support membranes which are microporous are used. Such microporous membranes can be made of ultrahigh molecular weight polyethylene (UPE) such as that disclosed in U.S. Pat. No. 4,778,601 A. These microporous membranes are generally produced from ultrahigh molecular weight polyethylene. The method employs extrusion of a solution of UHMW-PE and a porogen through a forming dye followed by a thermal phase separation of polymer and porogen. Microporous structures are subsequently created by removal of porogen.

The manufacturing of such microporous membranes typically includes the steps of forming a mixture of ultrahigh molecular weight polyethylene and a porogen. This mixture is heated to an elevated temperature to form a solution. The solution is extruded through a forming dye under moderate shear, thereby to form the membrane. The extrudate is cooled to cause phase separation into a polymer-rich, porogen-poor phase and a polymer-poor and porogen-rich phase in the membrane and then creating a microporous structure in the membrane by removing the porogen. The resulting microporous membrane is subsequently dried. A detailed description of the process can be found, e.g., in U.S. Pat. No. 4,778,601, the entire contents of which are incorporated by reference herein. In some embodiments, these microporous membranes are suitable as substrates or support membranes for the manufacturing of layered ultrafiltration membranes described herein.

In addition to the polymers described above, it is also possible to use porous membranes made from other woven or non-woven polymers for the production of ultrafiltration membrane composites described herein.

In some embodiments, suitable porous support membranes useful for the preparation of porous agarose membrane composites described herein have an average layer thickness of more than 10 µm. In other embodiments, these porous support membranes have a thickness ranging from 20 µm to 500 µm. In other embodiments, porous support membranes having a thickness of up to 120 µm are employed. In a particular embodiment, the porous support membrane has an average thickness of 100 µm and an average pore size of about 0.2 µm.

In some embodiments, agarose ultrafiltration membrane composites described herein can be prepared as shown, for example, in FIGS. 1a) and 1b). In order to achieve good bonding between the porous support membrane and agarose, it has been found that it is advantageous if the polymer support membrane is heated to an elevated temperature before it is contacted with the agarose solution. In some embodiments, the porous support membrane is heated to a temperature in the range of about 20 to 90° C., or to a temperature in the range of 45 to 75° C. In a particular embodiment, the porous support membrane is heated to 70° C. Before the agarose solution is contacted with the porous support membrane, it is also heated to an elevated temperature, for example, to a temperature in the range of 20 to 90° C., or to a temperature in the range of 45 to 75° C. When the agarose solution is cast and spread onto the surface of the porous support membrane, it is desirable to control the depth of penetration of the agarose solution into the underlying support membrane. Therefore, the porous support membrane treated with agarose is cooled as quickly as possible and transferred into a solid state. For the cooling step, the porous support membrane coated with agarose may be contacted with ice water and then with a water bath, which is maintained at a temperature less than 25° C. to effect gelation. The agarose coated membrane can also be contacted immediately with water without ice. In some embodiments, the temperature of the water bath is in the range of 5 to 60° C. In some embodiments, the temperature of the water is maintained at a temperature in the range of 10 to 40° C.

For the preparation of the agarose layer, typically an agarose solution is prepared comprising agarose at a concentration in the range of 1-12 wt.-%, or in the range of 5-11 wt.-%. In some embodiments, a commercially available agarose type such as, e.g., HD2, HR, ES 3:1 or LE is used. An example of commercial source of agarose is Hispanagar, S.A., Spain. The agarose powder is mixed with water at room temperature and then heated to an elevated temperature until an agarose solution is formed. When the agarose solution reaches a temperature of about 92° C., which is the melting point of agarose, the solution is stirred and degassed by centrifugation.

In general, the degassing is carried out by centrifugation at 3500 rpm and after cooling to a temperature in the range of 20 to 90° C., or to a temperature in the range of 45 to 75° C. In a particular embodiment, the temperature is about 70° C. The agarose solution is kept at this temperature until it is used to cast the agarose film.

The applied agarose solution may also comprise further additives such as, for example, Zinc chloride as a stabilizer. The stabilizer can be mixed together with the agarose powder and added to the aqueous solution in a suitable ratio. In this manner, a casting solution may be prepared comprising a stabilizer, e.g., Zinc chloride at a concentration of up to 15 wt.-%. In some embodiments, agarose solution comprises $ZnCl_2$ at a concentration of 10 wt.-%. However, solutions comprising even less than 5 wt.-% $ZnCl_2$ can be used.

In order to ensure penetration of the agarose solution into the porous support membrane, the porous support membrane is heated to a temperature of about 20 to 90° C. before the agarose solution is cast onto the membrane. In some embodiments, the porous support membrane is heated to a temperature in the range of 45 to 75° C., or to a temperature of about 70° C.

When the agarose solution is applied to the porous support membrane, it is important to ensure that just the right amount of the agarose solution penetrates into the porous support membrane. Furthermore, clogging of the pores of the porous support membrane by the agarose solution is undesirable. When the agarose solution is cast onto the porous support membrane, it is passed by suitable means uniformly onto the surface of the membrane. Suitable means include, but are not limited to, for example, use of a bird knife, or a Doctor blade with a gap. Subsequently, the coated membrane is taken immediately off of the heating source and the agarose solution is cooled and gelled. In order to achieve this, the coated membrane is immersed in a water bath and maintained at a temperature in the range of 15-20° C., or in the range of 18 to 20° C. In a particular embodiment, the temperature is about 20° C. The cooling can also be achieved by using an ice bath and/or subsequent immersing in a water bath.

The agarose layer can also be cross-linked in order to increase the pressure resistance. Further, a surface modification of the agarose coated membrane can also be performed, depending on the desired application of such membrane, e.g., for use as an ion-exchange membrane.

For cross-linking the agarose layer, the prepared agarose coated membrane may be brought into contact in a suitable manner with a solution comprising a cross-linking agent or crosslinker. In another embodiment the crosslinker may be added to the agarose solution before the agarose layer is cast onto the porous membrane support. In some embodiments, the crosslinker is included in the agarose solution at a concentration in the range of 0.01 wt.-% to 1 wt.-%. The direct addition of the crosslinker ensures that uniform cross-linking of the agarose occurs. Various cross-linking methods known in the art and those described herein can be used.

As indicated above, the crosslinking reaction may also entail a reaction between a dissolved crosslinking agent and the agarose layer of the membrane composite. A suitable reaction solution can be based in an aqueous or in an organic solvent, or an aqueous-organic mixture. Non-limiting examples of organic solvents include N-methyl pyrrolidone, dimethyl acetamide, dimethyl sulfoxide, dimethyl formamide and similar solvents.

Exemplary crosslinkers include, for example, di- or multi-functional epoxides such as, for example, epichlorohydrin, butanediol diglycidyl ether (BUDGE), ethylenediol diglycidyl ether (EDGE), polyethyleneglycol diglycidyl ethers and butane diepoxide. Multifunctional N-methyl methoxy compounds may also be used as crosslinking reagents. Examples include Cymel 385 and Powerlink 1174, both available from Cytec Industries of West Patterson, N.J. It has been found that the crosslinking reaction may be performed with solutions in which the crosslinking agent is present at a concentration ranging from about 5% to about 60% by weight, or from about 10% to about 40% by weight.

In a particular embodiment, divinylsulfone or DVS is used as a cross-linking agent. It has been demonstrated that DVS is especially suitable for cross-linking the agarose layer disclosed herein. DVS can be added to the agarose solution before casting the agarose layer and it can be applied in a much lower concentration relative to concentrations of crosslinking agents typically used, which are discussed above.

One of ordinary skill in the art can readily determine the suitable reaction conditions to employ, e.g., suitable concentrations, temperature, pressure and settings of the equipment used. Generally, it is expected that the reaction takes place at a faster rate at a higher temperature; however, the reaction temperatures should be selected such that the composite material described herein is modified as gently as possible. Further, one of ordinary skill in the art can also readily determine the influence of the reaction scale. For example, a larger reaction vessel will require more time to reach the reaction temperature and to cool down. Also, higher pressures may be used to increase the reaction rate. Depending on the reaction vessel, the practitioner may use a continuous flow reactor or other suitable means to improve contact of reactants to the membrane and thereby control the reaction. Higher concentrations will generally increase the reaction rate. The applied cross-linker type as well as the chosen solvent can also play a role in determining the needed reaction time. Hydroxyl ion activity is another important reaction condition.

Generally, reaction times that are used are in the range of about two to about one hundred hours, but reaction times of about four to about 24 hours are most typical. The reaction can be run at room temperature, and at up to about 60° C. In some embodiments, the reaction is run at a temperature ranging from 25° C. to about 50° C. One of ordinary skill in the art will be able to modify or reduce this time by increasing, for example, the mass transfer rates, by using a continuous roll to roll process or by further increasing reaction rates by adjusting temperature, concentrations or any other parameters.

When a multifunctional epoxy compound is used as a crosslinker, the reaction is run at basic conditions. Examples include sodium or potassium hydroxides. Typically, about 0.1 M to about 1 M hydroxide solutions are used. One of ordinary skill in the art can readily determine how to balance the reaction against alkaline deterioration of the agarose. Higher hydroxide concentrations and higher reaction temperatures generally accelerate alkaline deterioration; whereas, lower concentrations of hydroxide and lower temperatures generally slow down the deterioration rate as well as the crosslinking reaction rate.

Powderlink 1174, Cymel 385 and similar crosslinking agents (multifunctional N-methyl methoxy compounds) crosslink agarose through the hydroxyls on the agarose with an acid catalyst, such as toluene sulfonic acid. Other similar acid catalysts are organic sulfonic acids and non-oxidizing mineral acids. Weak or moderately acidic conditions of pH about 2 to 4 are generally appropriate. A preferred catalyst is Cycyt 4040, sulfonic acid catalyst available from Cytec Industries. It would be abundantly clear to one of ordinary skill in the art that strong acidic conditions may cause membrane deterioration and may not be recommended.

The reaction between the agarose membrane and the crosslinking reactants can be performed in aqueous solutions, e.g., in 100% water or water mixed with solvents such as methylethyl ketone, methylpentanediol, acetone or other ketones. However, this list of aqueous solutions is not limiting. In a particular embodiment, the cross-linking step is performed in an alkaline environment.

The ultrafiltration agarose membrane composites described herein can be modified using any suitable techniques known in the art or those described herein. In some embodiments, membranes suitable as ion exchanger materials can be made.

As used herein, the term "ion exchanger material" refers to a high molecular weight matrix having covalently bound charged substituents immobilized thereon. For overall charge neutrality, non-covalently bound counter ions are bound to the charged substituent by ionic interactions. The "ion exchanger material" has the ability to exchange its non-covalently bound counter ions for similarly charged binding partners or ions of the surrounding solution. Depending on the charge of its exchangeable counter ions, the "ion exchange material" is referred to as "cation exchange material" or as "anion exchange material". Depending on the nature of the charged group (substituent) the "ion exchange material" is referred to as, e. g. in the case of cation exchange materials, sulfonic acid or sulfopropyl or carboxymethyl resin. Further, depending on the chemical nature of the charged group/substituent the "ion exchange material" can additionally be classified as strong or weak ion exchange material, for example, based on the strength of the covalently bound charged substituent. For example, in some embodiments, strong cation exchange materials may include a sulfonic acid group (e.g., a sulfopropyl group) as a charged substituent. Exemplary weak cation exchange materials include a carboxylic acid group (e.g., a carboxymethyl group) as a charged substituent. An exemplary strong anion exchange material includes a quarternary ammonium group; whereas, an exemplary weak anion exchange material includes a diethylaminoethyl group as a charged substituent.

Further, the surface of a membrane composite prepared according to the methods described herein may include a negative charge, introduced through a one-step or two-step process. In case of a one-step process, the charge modifying reactant is added to the crosslinking solution. In case of the two-step method, the charge adding reaction is conducted before or after the crosslinking reaction.

Suitable reactants for forming a negatively charged membrane composite include, e.g., compounds of the structure $X(CH_2)_mA$ or alkali metals salts thereof, where X is halogen, preferably chloride or bromide; A is carboxyl or sulfonate. One or more of the following, e.g., reaction time, reactant concentration, pH, and temperature may be controlled to control the amount of negative charge added to the surface of the membrane.

In some embodiments described herein, divinylsulfone is used as a cross-linking agent under reaction conditions as described in U.S. Pat. No. 4,591,640, incorporated by reference herein. In some embodiments, the cross-linking reaction is performed at room temperature at a pH≤11 in the presence of a reducing agent, and unreacted vinyl groups are deactivated by means of a neutral hydrophilic deactivating substance comprising several hydroxyl groups.

In some embodiments, a positive charge is imparted to the membrane using glycidyl quarternary ammonium compounds or quarternary ammonium alkyl halides. In some embodiments, the halide molecules would have the structure of $Y(CH_2)_mB$, where Y is a halogen and B is a positively charge moiety.

In case of some of the embodiments described herein, the crosslinking reaction is carried out before adding charged groups to the membrane. By carrying out the crosslinking reaction before adding the charged groups, charge repulsion between like-charged groups may be avoided, thus preventing the polymer and membrane swelling. In other embodiments, crosslinking is carried out simultaneously with the charge addition. In this instance, it is desirable to control the crosslinking reaction at a rate which avoids swelling when the charge is added.

It is understood that, based on the teachings of the art coupled with the teachings of the instant application, one of ordinary skill in the art would be able to produce solvent resistant agarose ultrafiltration membrane composites described herein having the desirable pore size, charge and other material properties.

Using the methods described herein, ultrafiltration membrane composites are obtained, which include a layer of agarose and a porous support membrane, such that the agarose penetrates into at least a portion of the thickness of the porous support membrane, thereby to render the resulting agarose ultrafiltration membrane composite highly resistant to delamination. For example, in some embodiments described herein, agarose penetrates into the porous support membrane, thereby to reach an infiltration depth of 1 to 15 μm.

In some embodiments, the agarose layer has a thickness ranging from 1 μm to 100 μm, or ranging from 1 μm to 40 μm. In a particular embodiment, the agarose layer has a thickness ranging from 10 μm to 20 μm, or ranging from 15 μm to 20 μm. It is understood that the thickness of the agarose layer includes the agarose which penetrates into the porous support membrane as well as which is on top of the porous support membrane. In various embodiments described herein, the agarose layer penetrates into at least a portion of thickness of the porous support membrane, followed by gelling and solidification by cooling of the agarose.

The agarose ultrafiltration membrane composites described herein have several uses. The membrane composites can be used in analytical applications as well as in manufacturing of biologics at industrial scale. In some embodiments, the membrane composites are incorporated into a device.

As described herein, the agarose ultrafiltration membrane composites described herein are not only well suited for filtering of molecules of a certain size but are useful for virus purification in the normal flow or tangential flow format.

The membrane composites described herein are of high-resolution which are useful for removing viruses from a recombinant protein-containing solution. The use of such membrane composites for virus removal has several advantages, e.g., high capacity (e.g., as measured by the amount of protein of interest processed through a unit area of membrane composite) and high efficiency (e.g., as measured by log reduction value, LRV).

For example, when filtering an aqueous protein solutions through a membrane in order to remove viruses, the membrane typically has a pore size sufficiently small to retain viruses while permitting the protein of interest to pass through the membrane. It is generally desirable that such membranes have high virus retention and at the same time high throughput.

Virus retention is defined as Log Reduction Value (LRV), which is defined as a logarithm of the ratio of virus concentration (titer) in the feed to that in the filtrate. Throughput is defined as volume of protein solution that can be passed through a given area of membrane before complete fouling occurs. As used herein, the term "complete fouling" refers to a condition of the membrane wherein less than 10% of the original flux of the membrane is observed when effecting filtration with the membrane to attain virus retention of an LRV of 3.5 or greater. It is generally observed that higher flux through the membrane and low protein binding of membrane surface both lead to higher throughput. Throughput values of a given membrane vary greatly depending on the type and concentration of protein solution, pressure, ionic strength and other test conditions. Under typical process conditions, satisfactory ultrafiltration membranes have throughput of about 1000 $L/m^2$ or greater.

A more representative performance gauge of a virus retentive membrane is the membrane area that is calculated according to the $V_{max}$ method. More details about this method can be found in EP 1 775 016 B1, the teachings of which are incorporated by reference herein.

In some embodiments, the removal of viruses involves flowing a recombinant protein-containing solution through a filtration device containing the agarose ultrafiltration membrane composites described herein under suitable conditions to allow passage of the recombinant protein through the membrane composite, while preventing passage of viruses through the membrane composite.

In some embodiments described herein, the agarose ultrafiltration membrane composites used for removal of viruses are substantially hydrophilic in nature, i.e., readily wettable with water. In various embodiments described herein, it's the agarose layer in the membrane which makes the membrane hydrophilic. As discussed above, when used for virus removal, is desirable for the agarose ultrafiltration membrane composites to prevent the passage of the viruses through the membrane composite, while allowing the passage of a protein of interest. This is be achieved, at least in part, by having an agarose layer on a porous support membrane, as the pores of the applied agarose layer are sufficiently small to retain viruses, while allowing the passage of the protein of interest through the membrane In some embodiments, the membrane composites described herein are packaged in a device. In some embodiments, the device is a filtration capsule which comprises a pleated tube formed of one, two or three agarose ultrafiltration membrane composites described herein. In some embodiments, such a device is used for removal of viruses. However, without wishing to be bound by theory, it is contemplated that any suitable device format embodying the membrane composites described herein may be used.

In some embodiments, the membrane composites described herein (either alone or incorporated into a suitable device) can be used for removing virus effectively at an LRV greater than 6 for a comparatively large virus (e.g., murine leukemia virus) or at an LRV greater than 4 from a comparatively smaller virus (e.g., parvo virus).

In some embodiments, a device for removing virus from a protein containing solution comprises a housing suitable for containing a membrane composite filtration material described herein and further includes an inlet for receiving fluid to be filtered and an outlet for removing filtrate, where the filtration material comprises one, two or three composite void-free membranes, where the upstream layer is oriented such that its tightest side faces downstream.

In general, it has been observed that by incorporation of multiple asymmetric ultrafiltration membranes, arranged in a pleated configuration, with the membranes in "tight side down stream" orientation, the resulting filter capsule will have good viral retention capabilities, while maintaining good flux.

In a particular embodiment, a filtration capsule used for removing viruses comprises a tubular housing and a pleated filtration tube substantially co-axially enclosed within said housing. The tubular housing of the filtration capsule may be constructed to contain and channel a fluid process stream therethrough, and accordingly, is provided with a fluid inlet and a filtrate outlet. The fluid process stream, upstream of the pleated filtration tube, is introduced into the filtration capsule through the fluid inlet. Downstream of the pleated filtration tube, the fluid process stream is released from the filtration capsule through filtrate outlet.

For further details regarding the construction and operation of such devices, reference can be made to EP 2 163 296 A1 and to U.S. Pat. No. 5,736,044 A1, the teachings of which are incorporated by reference herein. Specifically, aspects of the filter cartridges can be employed in construction of a filter capsule incorporating the membrane composites described herein, without departing from the spirit and scope of the invention as described herein.

In order to remove viruses from a protein solution, a solution containing one or more protein(s) of interest and one or more types of viruses is subjected to a filtration step utilizing one of more agarose ultrafiltration membrane composites, which filtration can be conducted either in the TFF mode or the NFF mode. In either mode, the filtration is conducted under conditions to retain the virus generally having a 20 to 100 nanometer (nm) diameter, while permitting passage of one or more protein(s) through the membrane composite. In addition, when filtration of the solution is completed, the membrane is flushed with water or an aqueous buffer solution to remove any retained proteins. The use of the flushing step permits obtaining high yield of protein solution substantially free of viruses.

The present description coupled with the knowledge in the art enables one or ordinary skilled in the art to practice the methods described herein comprehensively.

Furthermore, it goes without saying to the person skilled in the art that, both in the examples given and also in the remainder of the description, the component amounts present in the compositions always only add up to 100% by weight or mol-%, based on the composition as a whole, and cannot exceed this, even if higher values could arise from the percent ranges indicated. Unless indicated otherwise, % data are % by weight or mol-%, with the exception of ratios, which are shown in volume data, such as, for example, eluents, for the preparation of which solvents in certain volume ratios are used in a mixture.

The temperatures given in the examples and the description as well as in the claims are always in ° C.

Embodiments are further illustrated by the following examples which should not be construed as limiting. The contents of all references, patents and published patent applications cited throughout this application, as well as the Figures, are incorporated herein by reference.

EXAMPLES

Example 1: Preparation of Agarose Solution

This is a representative example for preparing 10 wt.-% agarose solution. 10 g of agarose powder (type HD2, obtained from Hispanagar, and types HR, ES, 3:1 and LE, obtained from Aquapor) are added to 90 g of water and mixed at room temperature for 30 min. The hydrated agarose mixture is then heated in a microwave until an agarose solution is formed. The solution is substantially degassed by centrifugation at 3500 rpm and 70° C. for 5 min. The solution's free flowing characteristics are retained at this temperature. The solution is kept in the hybridizer at 70° C. until it is used to cast a thin agarose film or layer. Other agarose solution concentrations are prepared in a similar way using the appropriate relative ratio of agarose and water.

Example 2: Preparation of Agarose Solution Having Other Additives

This is a representative example for preparing 10 wt.-% agarose solution (Type HR) containing 10 wt.-% Zinc Chloride.

An agarose solution is initially prepared as described in Example 1. 10 g of Zinc Chloride (98%, obtained from Acros) are added to the 10 wt.-% agarose solution and mixed in the hybridizer at 70° C. until the salt is dissolved. The solution's free flowing characteristics are retained under these conditions. Then the solution is kept in the hybridizer at 70° C. until it is used to cast a thin agarose film. Other agarose solution concentrations comprising different Zinc Chloride concentrations are prepared in a similar way using the appropriate relative ratio of agarose, Zinc Chloride and water.

Example 3: Water Flux Measurements of Agarose Ultrafiltration Membrane Composites The water flux measurements are carried out using an Amicon (EMD Millipore Corp., Billerica) stirred cell. A wetted membrane (in 50:50 IPA:water mixture) is placed in the cell. The cell is filled with deionized water, connected to a pressurized air supply, and pressurized up to 25 psig. The effluent is collected over a standard test time and the flux is calculated using the known membrane area. Alternatively, automatic flux testing instrumentation may be used to test the membrane composites.

Example 4: Molecular Weight Cut-Off Determination of the Agarose Ultrafiltration Membrane Composites Rejection of model solutes is the most common method for assessing the performance of ultrafiltration membranes.

Thus, nominal molecular weight limits (NMWL) can be determined with a variety of solutes; frequently proteins are used. The NMWL of a UF membrane is typically the molecular mass of the smallest protein that the membrane rejects at a chosen level or rejection, usually 90 to 95%. Other solutes that can be used to characterize UF membranes include dextrans, which are available in a large range of molecular weights. The whole rejection spectrum, from molecules of about 1000 Da molecular weights to molecules to about 2,000,000 Da can be measured in a single test.

The molecular weight cut off determination is based on methods published, inter alia, by L. Zeman and M. Wales, in Separation Science and Technology, 16 (30), p. 275-290 (1981). The membrane composites to be characterized are challenged with solutions containing polydisperse dextrans with molecular weights ranging from 1000 to 2,000,000 Da in a suitable device. The permeation rate during the test is controlled at low flux to minimize concentration polarization. Feed and permeate streams are sampled and analysed by size exclusion chromatography (SEC) and the chromatographic data are used to calculate rejection as a function of dextran molecular mass.

Rejection (R) with dextran molecular mass is $R=1-Cp/Cf$, where Cp and Cf are the dextran concentration of given molecular mass in the feed and the permeate, respectively. The molecular weight at which the membrane retains 90% of the dextran feed is the 90% dextran rejection value (R90).

Figure 3:
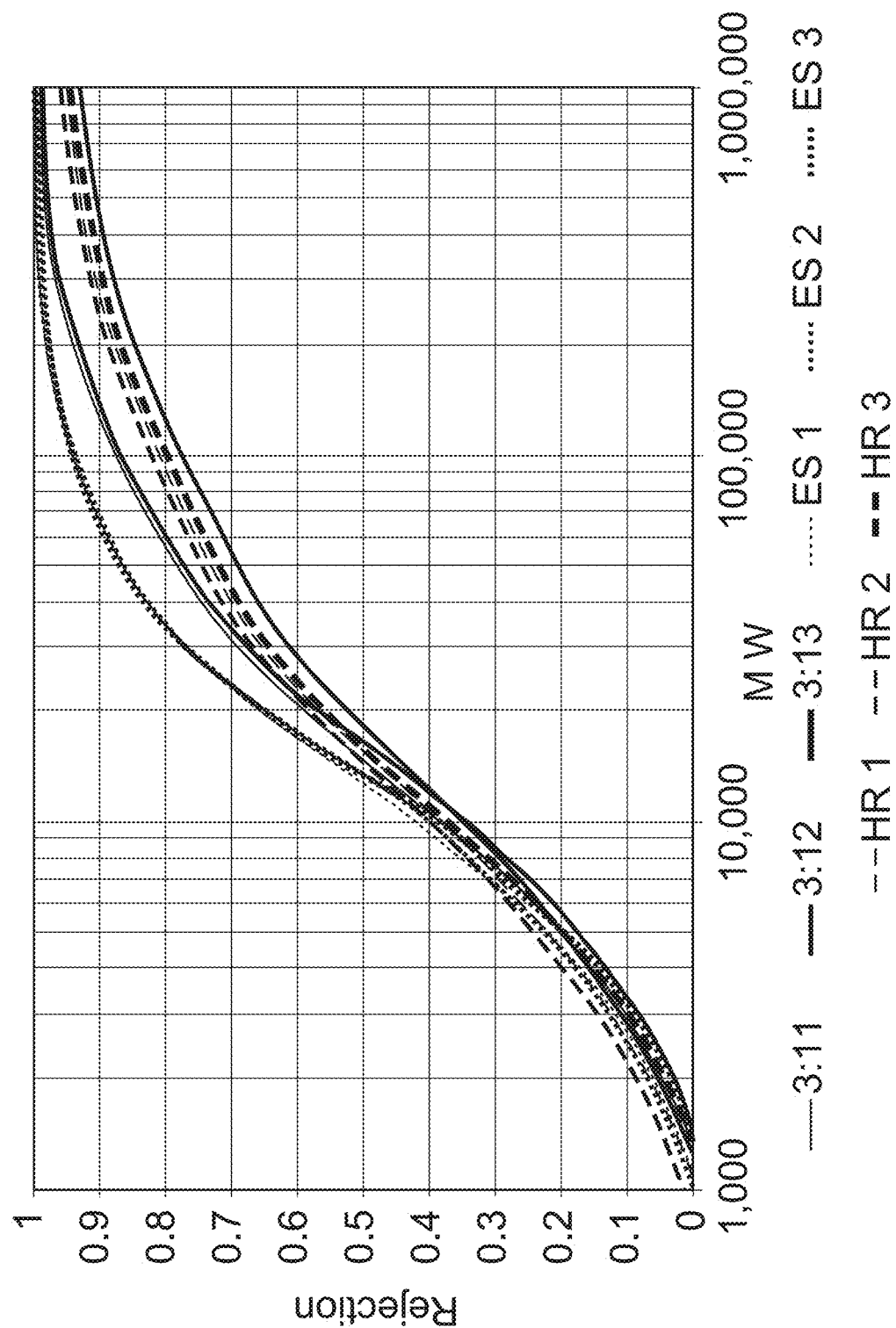
FIG. 3 shows rejection curves illustrating the molecular weight cut-off of representative agarose membrane composites described herein. The X-axis depicts the molecular weight cut-off and the Y-axis depicts the rejection. The analysis is carried out as outlined in Example 4.

Typical NMWL data obtained from this analysis for representative agarose membrane composites is shown in FIG. 3.

Example 5: Method of Making 65 kDa, 120 kDa and 250 kDa NMWL Agarose Ultrafiltration Membrane Composite This example illustrates a process for making a 65 kDa nominal molecular weight cut-off agarose ultrafiltration membrane composite.

A polyvinylidene fluoride (PVDF) microporous membrane, having an average pore size of 0.2 μm and an average thickness of 100 μm was employed as the microporous membrane substrate. The microporous substrate was attached to a hot plate and maintained at a temperature of 70° C.

A polymer solution containing 10 wt.-% agarose (Type ES) prepared as described in Example 1, was cast onto the heated microporous PVDF membrane using a micrometer adjustable knife with 25 μm gap. The agarose coated membrane was then quickly removed from the heated plate and immersed in a water bath maintained at a temperature of 20° C. (as shown in FIG. 1A).

Figure 2A:
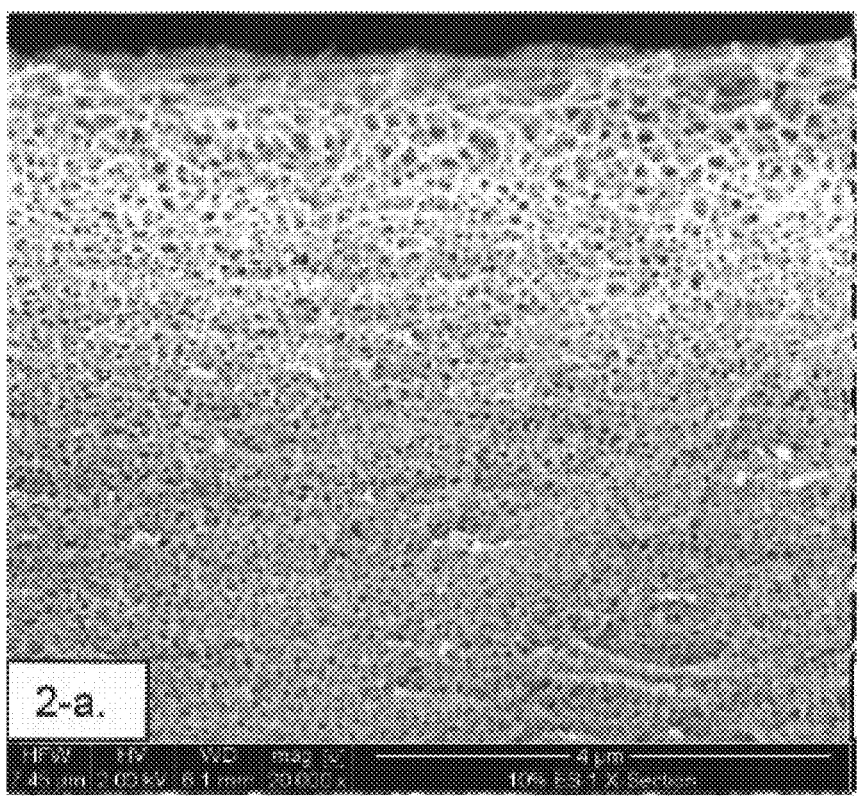
FIGS. 2A and 2B shows high magnification SEM micrographs of agarose ultrafiltration membrane composites (field emission scanning electron microscope) prepared as described in Example 5. SEM is carried out under cryogenic conditions to preserve pore structure and analysed samples are cooled down to temperatures below −150° C.
Figure 2B:
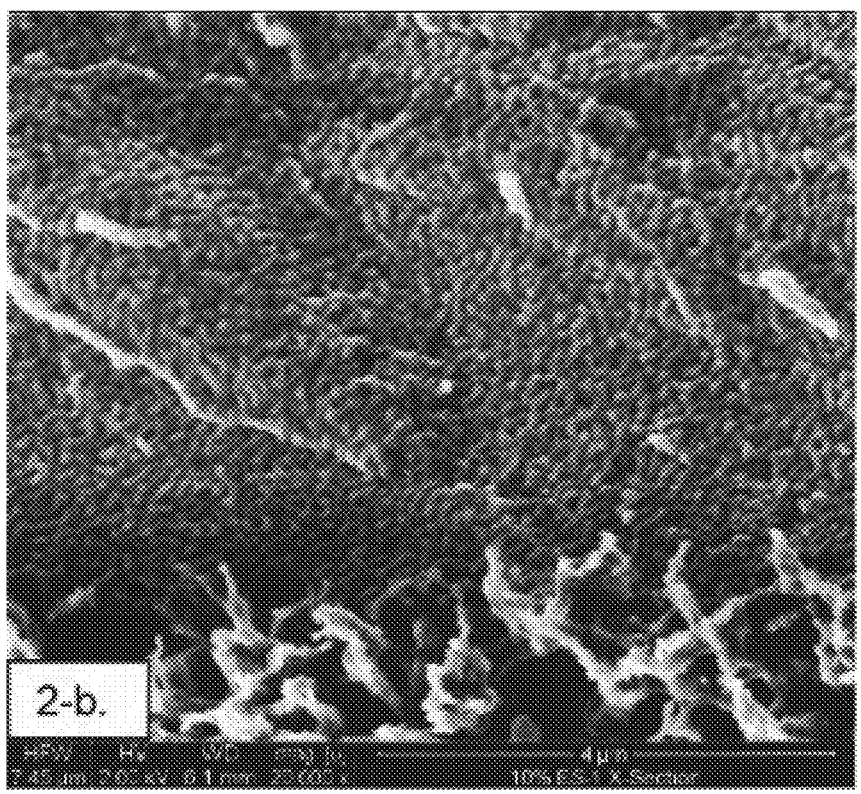
Figure 2C:
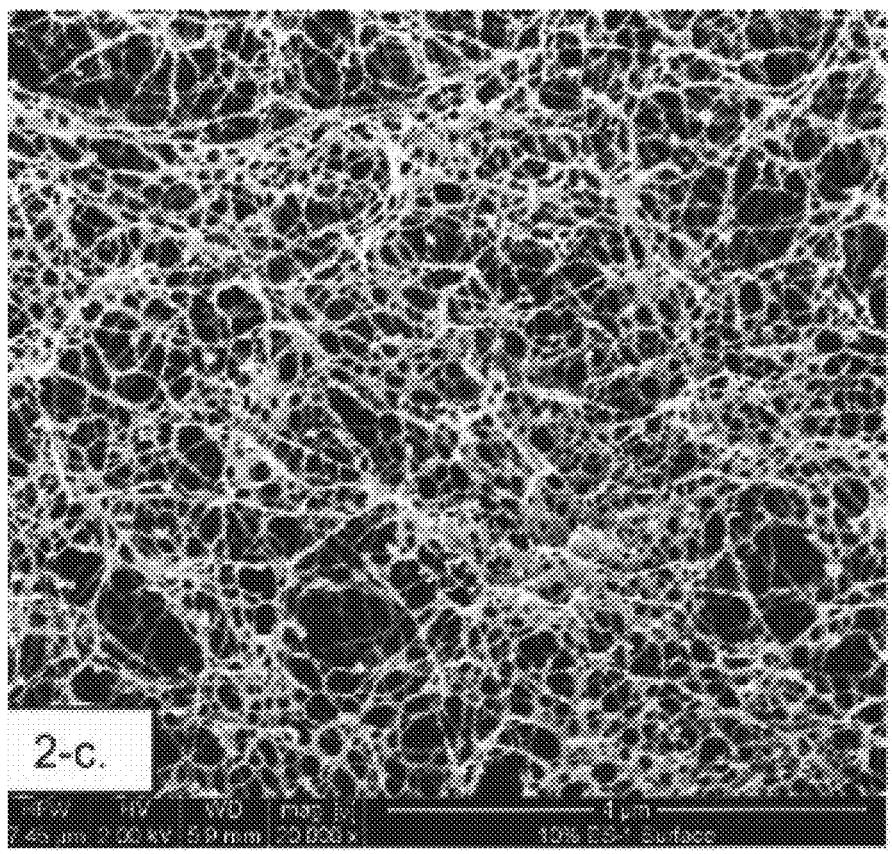
FIG. 2C shows a surface image. The membrane appears to be slightly asymmetric having the top surface more open than the bottom surface.

Membrane imaging was carried out on a cryo stage manufactured by Gatan, model Alto 2500. The Alto 2500 has a dedicated preparation chamber that attaches directly to a high resolution Scanning Electron Microscope (SEM). The chamber includes a cooled fracture knife insuring controlled depth fracturing. A separate two pot rapid freezing station is used to freeze the samples. A cross-section of the membrane composite produced is shown in FIGS. 2A-2C. The thickness of the agarose coating above the surface of the microporous substrate is about 15 μm.

The membrane composite is free of defects and has the flux and retention characteristics (determined as described in Examples 3 and 4) listed in Table 1.

A 120 kDa NMWL agarose ultrafiltration membrane composite was made as follows. A polyvinylidene fluoride (PVDF) microporous membrane, having an average pore size of 0.2 μm and average thickness of 100 μm is employed as the microporous membrane substrate. The microporous substrate is attached to a hot plate and maintained at a temperature of 70° C.

A polymer solution containing 10 wt.-% agarose (Type 3:1), prepared as described in Example 1, is cast onto the heated microporous PVDF membrane using a bird or micrometer adjustable knife with 25 μm gap. The agarose coated membrane is then quickly removed from the hot plate and immersed in a water bath maintained at a temperature of 20° C.

The thickness of the agarose coating above the surface of the microporous substrate is about 18 μm, as determined by SEM. The membrane composite is free of defects and has the flux and retention characteristics (determined as described in Examples 3 and 4) listed in Table 1. Lastly, a 250 kDa NMWL agarose ultrafiltration membrane composite is made as follows.

A polyvinylidene fluoride (PVDF) microporous membrane, having an average pore size of 0.2 micron and average thickness of 100 μm is employed as the microporous membrane substrate. The microporous substrate is attached to a hot plate and maintained at a temperature of 70° C.

A polymer solution containing 10 wt.-% agarose (Type HR) prepared as described in Example 1, is cast onto the heated microporous PVDF membrane using a bird knife with 25 μm gap. The coated membrane is then quickly removed from the hot plate and immersed in a water bath maintained at a temperature of 20° C.

The thickness of the agarose coating above the surface of the microporous substrate is about 15 μm, as determined by SEM. The membrane composite is free of defects and has the flux and retention characteristics (determined as described in Examples 3 and 4) listed in Table 1.

TABLE 1

Flux and retention characteristic of different agarose ultrafiltration membrane composites

| Agarose grade | R90 [kDa] | Permeability [lmh/psi] |
|---|---|---|
| ES | 65 | 2.7 |
| 3:1 | 120 | 2.8 |
| HR | 250 | 3.6 |

Figure 1B:
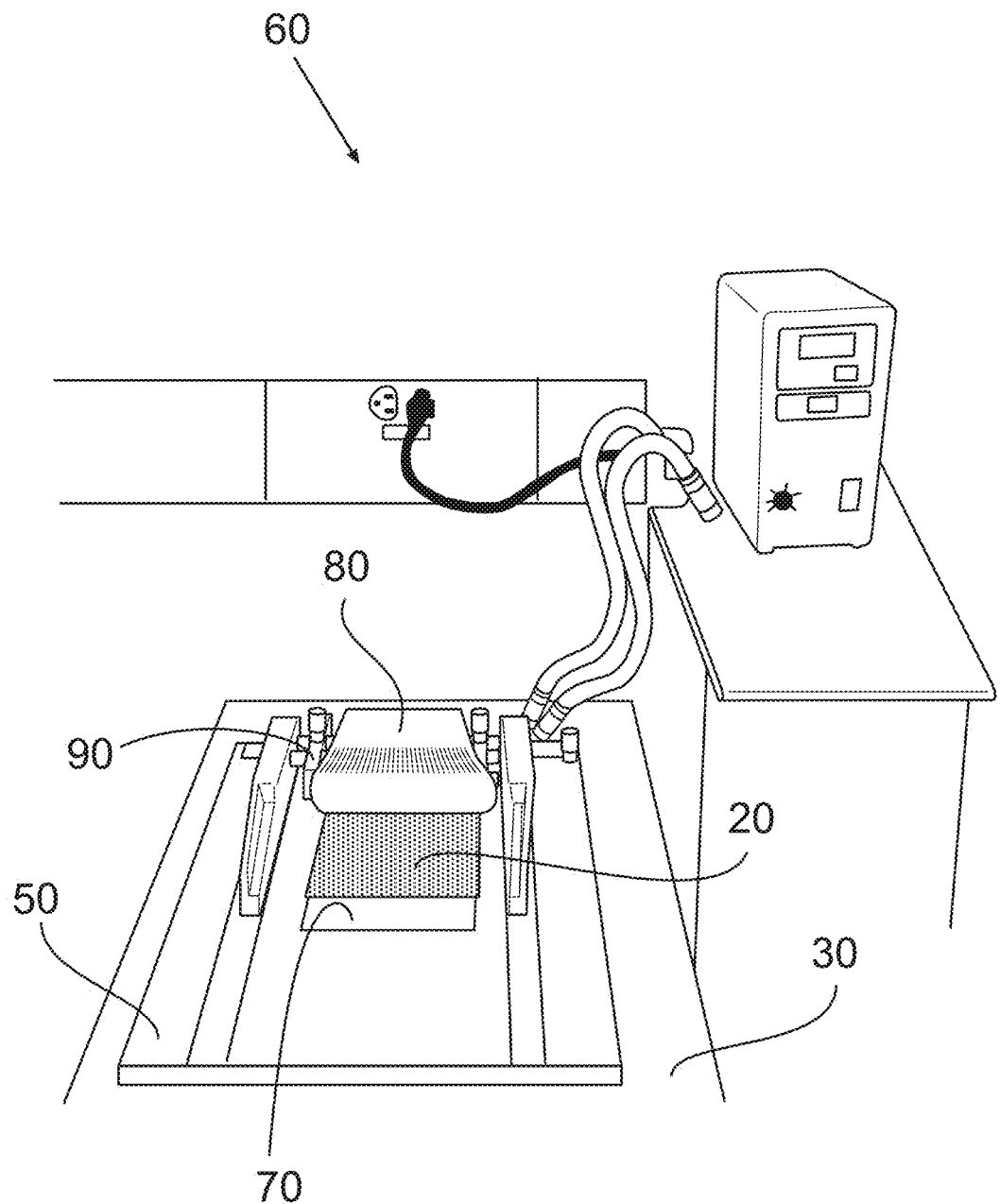

Example 6: Dependence of Agarose Membrane Composite Molecular Weight Cut-Off and Water Flux on the Concentration of Agarose in the Casting Solution The setup used to prepare the agarose membrane composites is highlighted in FIG. 1. A non-porous plastic sheet (70) is first taped down to a hot or heated plate (30) maintained at 70° C. A PVDF microporous membrane substrate (20) (pore size rating 0.2 μm) is placed on top of the plastic sheet (70) and cured in place by taping it to the plastic sheet (70). A polymer solution containing 5, 7 and 10 wt.-% agarose (Type ES) prepared as described in Example 1, is spread as a thin layer between the PVDF membrane substrate (20) and the plastic sheet (70) using a micrometer adjustable knife (90) with a gap of around 35 μm. The agarose coated membrane-sheet pair is then removed from the hot or heated plate (30) and placed on an ice bath to effect agarose gelation and form the ultrafiltration layer by a thermal phase inversion. The membrane sheet pair is then contacted with water (in a bath maintained at 20° C.) to prevent damaging the agarose ultrafiltration layer while the plastic sheet (70) is being removed, leaving behind a microporous substrate coated with a thin ultrafiltration layer of agarose.

Figure 4:
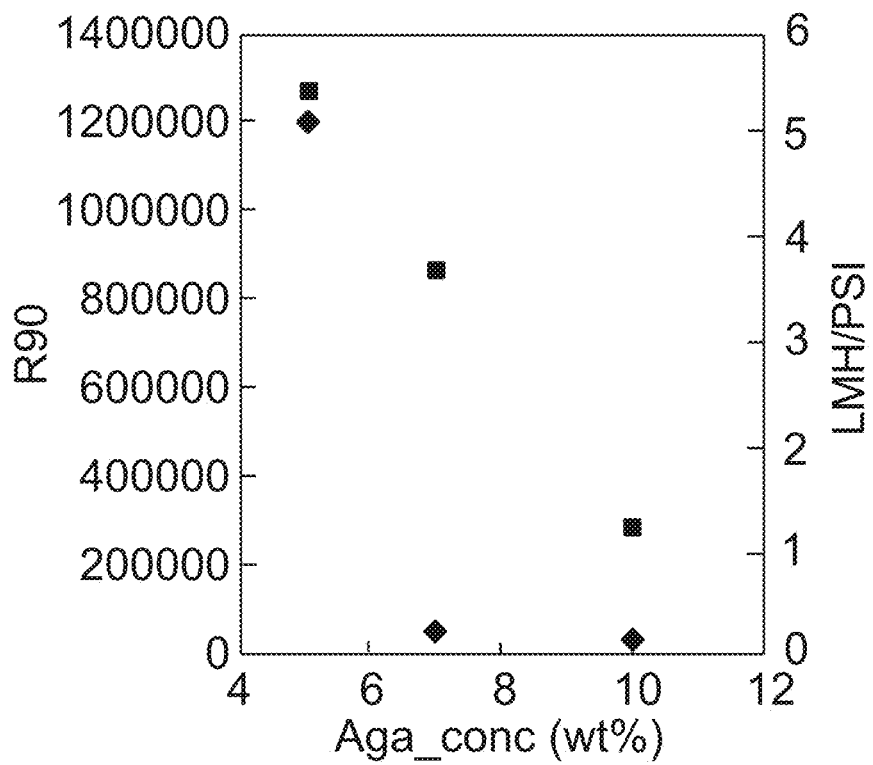
FIG. 4 is a graph illustrating the dependence of molecular weight cut-off and flux of the agarose membrane composites on the concentration of the agarose casting solution employed. R90 and water flux data are determined as described in Examples 3 and 4. The X-axis depicts the agarose concentration; the right Y-axis shows the flux in LMH/PSI and the left Y-axis shows R90.

As depicted in FIG. 4, the membrane molecular weight cut-off and flux are a function of agarose concentration in the casting solution. An R90 (flux) of 25 kDa (1.2 LMH/PSI), 47 kDa (3.7 LMH/Psi) and 1200 kDa (5.4 LMH/PSI) is obtained at 10, 7 and 5 wt.-% agarose solution concentration, respectively.

Figure 5:
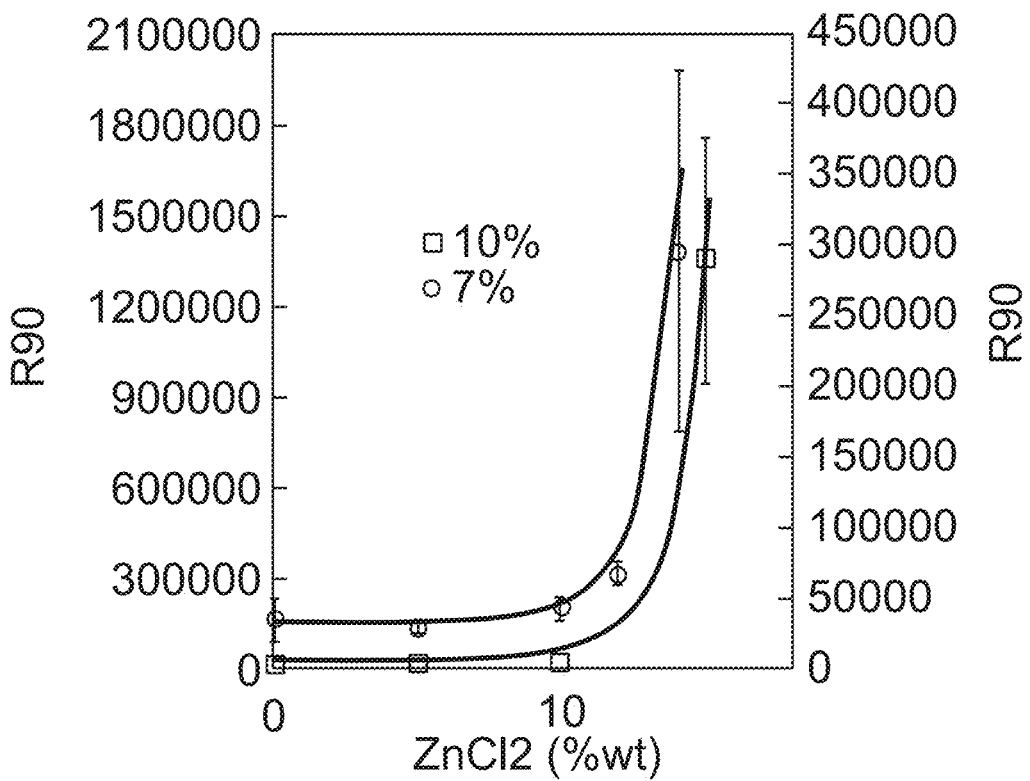
FIG. 5 is a graph illustrating the dependence of molecular weight cut-off of the agarose membrane composites described herein on the ionic strength of the agarose casting solution that is employed. R90 numbers were determined as described in Example 7. The X-axis depicts the concentration of $ZnCl_2$ used and the right Y-axis and the left Y-axis depict R90 values of 7 wt.-% and 10 wt.-% agarose solutions, respectively. Regardless of the concentration of agarose in the casting solution, higher casting solution ionic strength resulted in a more open ultrafiltration membrane. As expected, at any given ionic strength, a more open ultrafiltration membrane is obtained at lower agarose casting solution concentration.

Example 7: Dependence of Agarose Membrane Composite Molecular Weight Cut-Off on the Zinc Chloride Concentration in the Casting Solution A representative membrane composite is prepared as described in Example 6 with the only difference being the use of agarose casting solution (7 and 10 wt.-% HR type agarose) prepared as described in Example 2. As depicted in FIG. 5, higher salt concentrations in the casting solution result in a more open UF membrane. At 7 wt.-% agarose casting solution concentration comprising 0, 5, 10, 12 and 14 wt.-% $ZnCl_2$, the following respective R90 are obtained: 35 kDa, 31 kDa, 44 kDa, 70 kDa and 300 kDa, respectively. At 10 wt.-% agarose casting solution concentration comprising 0, 5, 10, 15 wt.-% $ZnCl_2$, the following respective R90 were obtained: 15 kDa, 16 kDa, 26 kDa, and 1350 kDa.

Example 8: Crosslinking of Agarose Membrane Composite with DVS to Prevent Agarose Layer Compression Under Pressure A representative agarose membrane composite is prepared as described in Example 5. Three membrane composite membrane discs (25 mm diameter each) are soaked (all at once) in a 20 ml Sodium carbonate solution (0.5M at pH 11) comprising 0.1, 0.5 and 1% solution of mercaptoethanol (obtained from Sigma-Aldrich) in DI water and mixed for 6 hours. The membranes are then tested as described in Example 3.

Figure 6:
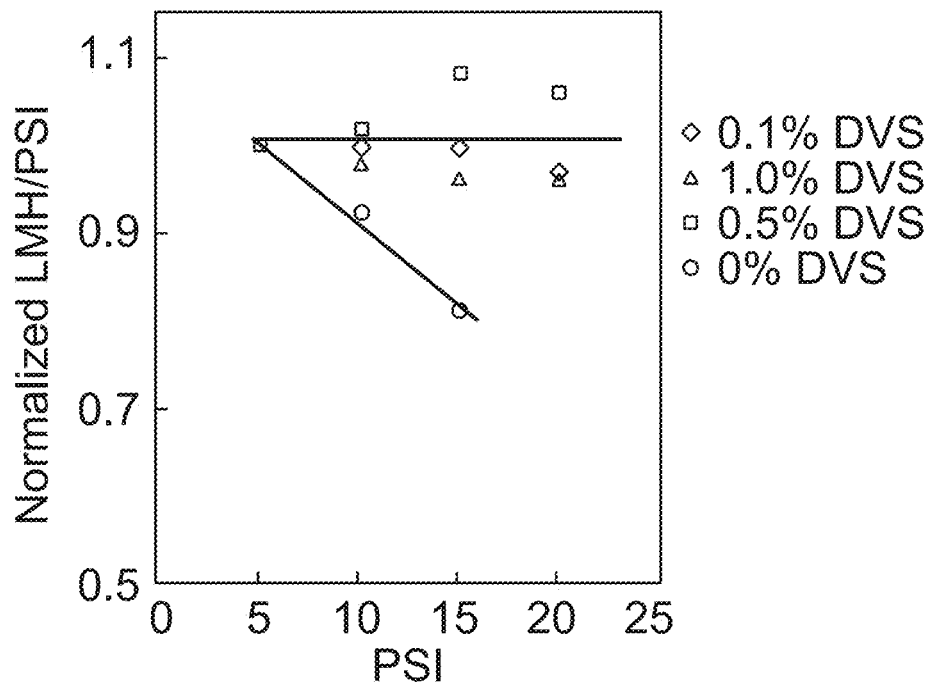
FIG. 6 is a graph illustrating the crosslinking of the agarose layer with DVS to prevent it from compression under pressure. It was demonstrated that a 20% loss in flux at 15 psi can be avoided by crosslinking the agarose layer with 0.1% DVS solution. The X-axis shows the pressure in PSI and the Y-axis shows the normalized flux in LMH/PSI.

As depicted in FIG. 6, as prepared composite membrane is compressible under pressure resulting in a 20% loss of water flux at 15 psi. Crosslinking with DVS improves the mechanical properties of the agarose gel layer and prevents its collapse under pressure. Only 0.1 wt.-% DVS solution is necessary.

Example 9: Drying of Agarose Membrane Composites

This example illustrates the drying of agarose membrane composite which is in 20% glycerine solution (in water).

A representative agarose membrane composite is prepared as described in Examples above The molecular weight cut-off and the flux of the membrane composite is determined as described in Examples 3 and 4. The membrane composite is removed from the test stirred cell, washed in water and treated with 20 vol.-% glycerine in water solution, which acts as a humectant. Subsequently, the membrane composite is dried under ambient conditions for 3 days.

Figure 7:
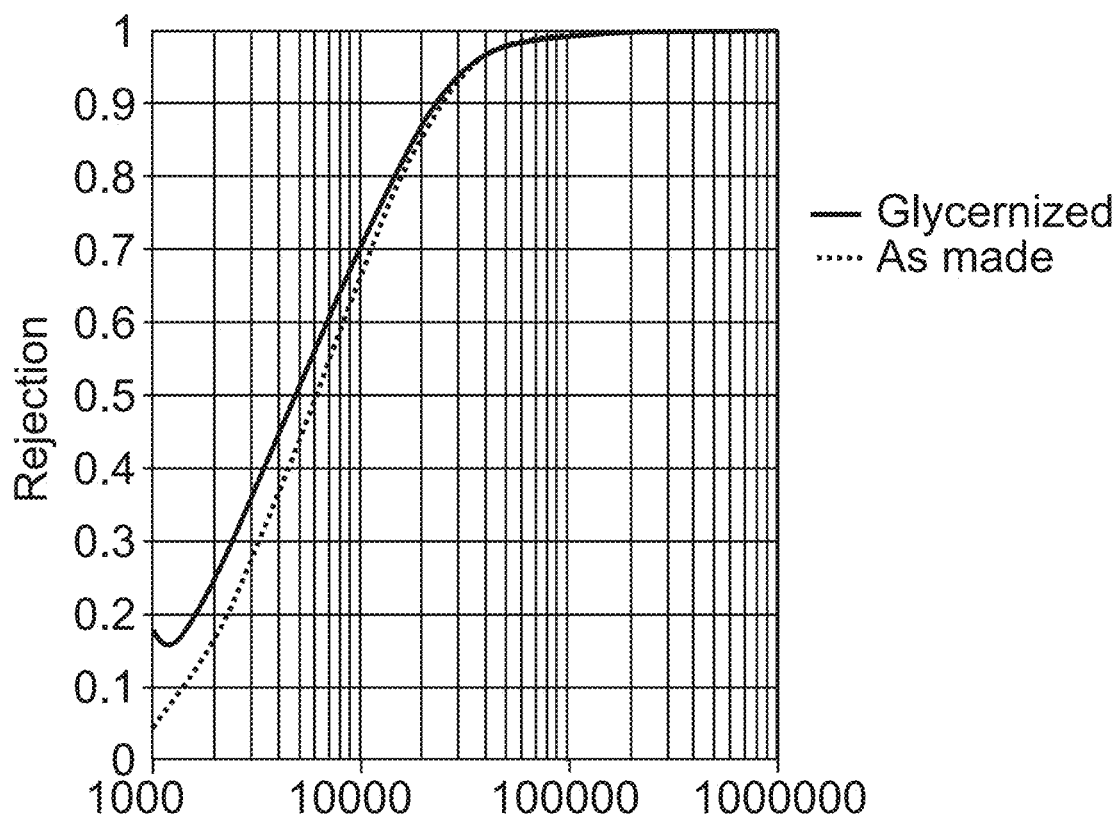
FIG. 7 is a graph illustrating that drying a wet agarose membrane composite which is in 20% glycerine solution (in water) has no negative impact on the molecular weight cut-off of the membrane, i. e., drying process does not collapse the pore structure of the agarose layer.

As depicted in FIG. 7, the membrane composite molecular weight cut-off does not change after drying. The flux of the membrane composite before and after drying remains unchanged at 0.7 LMH/psi.

Example 10: Assessment of Infiltration of Agarose Into the Substrate

This example illustrates the assessment of the depth of agarose infiltration into a microporous PVDF substrate.

Some penetration of the agarose into the microporous substrate is necessary to obtain a sufficiently strong bond between the substrate and the ultrafiltration agarose layer and to render the agarose membrane composite highly resistant to delamination. The infiltration depth analysis is carried out using a Scanning Electron Microscope-Energy Dispersive Spectroscopy (SEM-EDS) Instrument (INCA300, Oxford Instruments, England). Micro-region compositional analysis is carried out at 5 µm intervals in the Z-direction starting from the surface of the microporous substrate and extending 40 µm into the substrate.

Figure 8:
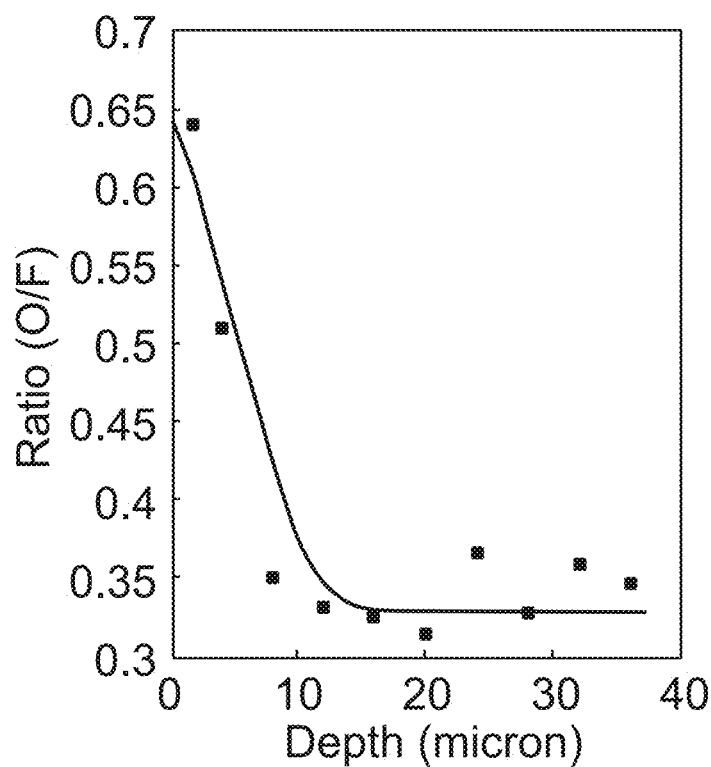
FIG. 8 is a graph illustrating the infiltration depth of agarose layer into the upper layer of the microporous PVDF substrate. The elemental analysis data is obtained using SEM-EDS Instrument (INCA300, Oxford Instruments, England) and a micro region compositional analysis (represented by a star on the SEM insert) is carried out at 5 μm intervals in the Z-direction starting from the surface of the microporous substrate and extending 40 μm into the substrate. The fluorine signal is attributed to the PVDF microporous substrate, while the oxygen signal is attributed to agarose. Most of the agarose is localized in the first layer up to 10 μm depth of the microporous substrate. The X-axis shows the depth in microns and the Y-axis shows the ratio (O/F).

A representative agarose membrane composite is prepared as described in Example 5. The elemental analysis data obtained from the SEM-EDS is used to determine the relative concentrations of oxygen and fluorine atoms present in the sample. The fluorine signal is attributed to the PVDF microporous substrate, while the oxygen signal is attributed to agarose. As depicted in FIG. 8, the depth of agarose infiltration into the PVDF substrate is approximately 10 µm.

Example 11: Determination of Gelling Point of the Different Grades of Agarose This example illustrated the determination of the gelling point of different grades of agarose using a rotational viscosimeter.

Representative 7 wt.-% agarose solutions are prepared as described in Example 1 and stored in the hybridizer at 70° C. A Brookfield viscosity standard (Lot #112305) is used to check for instrument calibration: Reported/observed, 489/502±6cp. (A leg guard is used to establish boundary conditions, 50 RPM speed, LV2 spindle).

16 ml of agarose solution is poured into a sample chamber that fits into a water jacket mounted on a Brookfield viscosimeter Model DV-II+Pro (Brookfield Engineering Labs Inc.). The temperature of the sample chamber is set to 55° C. using a circulating temperature bath (containing water, VWR Scientific Products Model #1130-1) and a direct readout of chamber temperature is provided using an embedded RTD sensor connected to the DV-II-Pro Viscosimeters. Each sample of agarose solution is left to equilibrate for 10 minutes at 55° C. in the temperature-controlled chamber before collection of data points is started. Measurements are acquired using Wingather V3.0 software (Brookfield Engineering Labs Inc.) with a SC4-25 spindle at a rotation speed of 2 rpm and starting torque of 2%.

Figure 9:
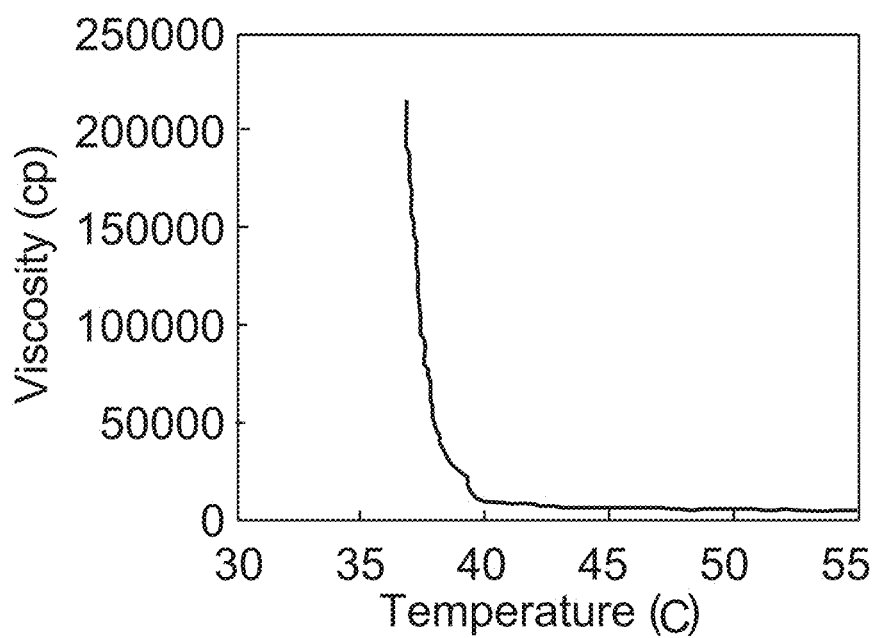
FIG. 9 is a graph illustrating the increase in viscosity of a representative agarose solution (7 wt.-%) as the gel point is reached. A rotational viscosimeter is used to carry out the analysis as described herein. The X-axis shows the temperature in Celsius and the Y axis shows the viscosity.

The temperature of the chamber containing the agarose solution is lowered by continuously adding ice to the circulating temperature bath until the gel point is reached, evidenced by a first order increase in viscosity, as depicted in FIG. 9. Data collection is stopped and the viscosimeter is turned off once the torque is extended 95%. The onset temperature of gelling is recorded in Table 2 for a representative set of different agarose grades at 7 wt.-%.

TABLE 2

Onset temperature of gelling for different agarose grade solutions (7 wt.-%) as determined using a rotational viscosimeter

| Sample | Onset Temp [° C.] |
|---|---|
| LE | 39 |
| HR | 37 |
| ES | 39 |
| 3:1 | 38 |

Example 12: Throughput and Virus Retention Characteristics of an Agarose Ultrafiltration Membrane Composite Using a Solution Containing Cell Culture Media For throughput and virus retention studies with cell culture media, agarose ultrafiltration membrane composites are prepared as described in Example 1 using 7 wt.-% agarose (type 3:1) and GEHP (0.2μ hydrophobic PES) as a microporous substrate. The membrane composite has an R90 of 485 kDa and a water permeability of 4 LMH/psi. A membrane composite disk (25 mm) is cut out and placed in a Swinnex® filter holder device with a filtration area of 4.5 cm$^2$. One layer of a polyester non-woven fabric is used at the bottom/outlet side of the device. A 25 mm Viresolve® Pro device is used as a control. The membrane composite has an R90 of 100 kDa and a water permeability of 14 LMH/psi.

Water permeability, cell culture media throughput and virus retention are tested in a constant pressure setup equipped with a load cell. An EMD Millipore Corp. proprietary chemically defined cell culture media for the growth of Chinese Hamster Ovary (CHO) cells is used for the study.

Model virus, bacteriophage PhiX-174, is spiked into acetate buffer at pH 5, conductivity 13.5 mS/cm, to concentration 1.4*107 PFU/ml. The devices were flushed with buffer for 10 min, feed was switched to the virus-spiked vessel, and virus-spiked cell culture media was flowed through each device at constant pressure of 10 psi. Throughput was monitored by measuring the permeate volume at various time points.

Figure 10:
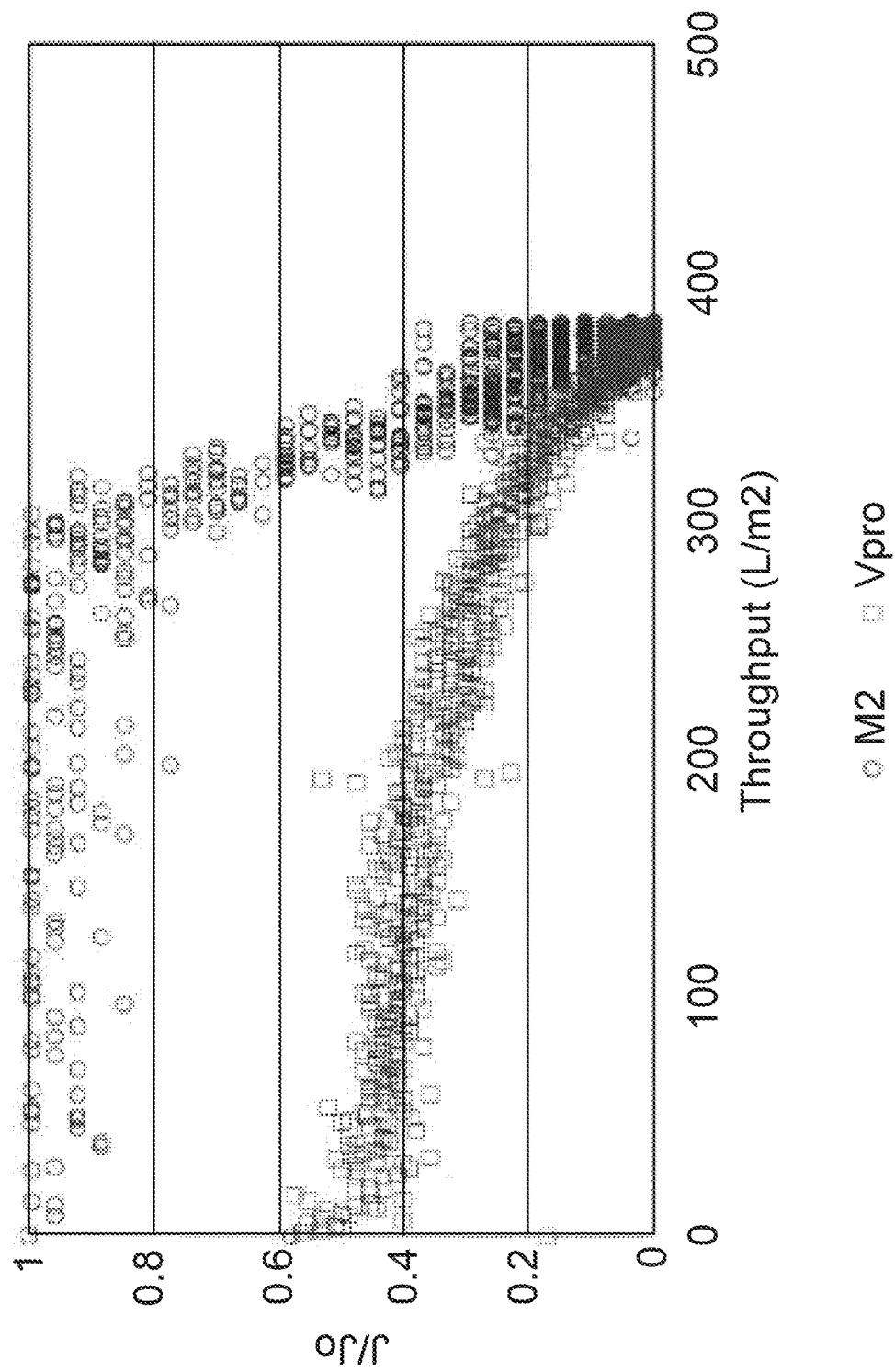
FIG. 10 is a graph illustrating the characteristic flux decay of an agarose ultrafiltration membrane composite and a Viresolve® Pro membrane. A virus-spiked cell culture media is flowed through each device at constant pressure at 10 psi and the membrane flux is measured. The throughput is monitored by measuring the permeate volume at various time points. The X-axis shows the throughput and Y axis the J/Jo values.

Samples for virus assays were collected at various throughputs (15, 250, and 500 L/m$^2$) and LRV results are shown in Table 3. FIG. 10 shows flux decay for agarose ultrafiltration membrane composites and Viresolve® Pro membranes. Agarose ultrafiltration membrane composites described herein show a different plugging behaviour than Viresolve® Pro, where the flux decays at a faster rate before the membrane capacity is reached.

TABLE 3

LRV results for agarose ultrafiltration membrane composites and Viresolve ® Pro membranes challenged with model virus feed stream

| Throughout [L/m$^2$] | Agarose ultrafiltration membrane composite | Viresolve ® pro |
|---|---|---|
| 15 | >6.4 | >6.4 |
| 250 | >6.4 | >6.4 |
| 500 | 3.9 | >6.4 |

The specification is most thoroughly understood in light of the teachings of the references cited within the specification which are hereby incorporated by reference. The embodiments within the specification provide an illustration of embodiments and should not be construed as limiting in scope. The skilled artisan (practitioner) readily recognizes that many other embodiments are encompassed by this disclosure. All publications and reference materials are incorporated by reference in their entirety. To the extent that the material incorporated by reference contradicts or is inconsistent with the present specification, the present specification will supercede any such material. The citation of any references herein is not an admission that such references are prior art.

Unless otherwise indicated, all numbers expressing quantities of ingredients, cell culture, treatment conditions, and so forth used in the specification, including claims, are to be understood as being modified in all instances by the term "about." Accordingly, unless otherwise indicated to the contrary, the numerical parameters are approximations and may vary depending upon the desired properties sought to be obtained by the embodiments disclosed herein. Unless otherwise indicated, the term "at least" preceding a series of elements is to be understood to refer to every element in the series. Those skilled in the art will recognize, or be able to ascertain using no more than routine experimentation, many equivalents to the specific embodiments described herein. Such equivalents are intended to be encompassed by the following claims.

Many modifications and variations of the embodiments disclosed herein can be made without departing from its spirit and scope, as will be apparent to those skilled in the art. The specific embodiments described herein are offered by way of example only and are not meant to be limiting in any way. It is intended that the specification and examples be considered as exemplary only, with a true scope and spirit of the disclosure being indicated by the following claims.

What is claimed is:

1. A method for making an agarose ultrafiltration membrane composite, the method comprising the steps of:
   i. providing a porous support membrane having an average pore size ranging from 0.01 μm to 10 μm and an average thickness ranging from 20 μm to 150 μm,
   ii. providing an agarose solution, wherein the agarose solution further comprises ZnCl2 at a concentration equal to or less than 15 wt.-%, and
   iii. casting a layer of the agarose solution onto the porous support membrane, and
   iv. immersing the agarose coated porous support membrane into a water bath at a temperature below the gelling point of the agarose solution
   in an agarose ultrafiltration membrane composite having average pore size less than 0.1 μm.

2. The method according to claim 1, wherein the porous support membrane comprises a polymer selected from the group consisting of polyethylene, polypropylene, polycaprolactam, poly(hexamethylene adipamide), polyethylene terephthalate, polyether-ether ketone, polysulfone, polyethersulfone, polytetrafluoroethylene, and polyvinylidene fluoridepolyvinylidene fluoride (PVDF).

3. The method according to claim 1, wherein the porous support membrane comprises a polymer selected from the group consisting of polyvinylidene fluoride (PVDF), ultra-high molecular weight polyethylene (UHMW-PE), polycaprolactam, poly(hexamethylene adipamide), polysulfone, and polyethersulfone.

4. The method according to claim 1, wherein the agarose solution in (ii) comprises agarose at a concentration ranging from 1-12 wt.-%.

5. The method of claim 2, wherein the agarose solution in (ii) comprises a crosslinker at a concentration ranging from 0.01 wt.-% to 1 wt.-%.

6. The method according to claim 1, wherein the agarose solution in (ii) comprises ZnCl2 at a concentration equal to or less than 15 wt.-% and divinylsulfone (DVS) as crosslinker.

7. The method according to claim 1, wherein agarose solution in step (ii) is heated to a temperature ranging from 20 to 90° C.

8. The method according to claim 1, wherein the porous support membrane in step (iii) is heated to a temperature ranging from 20 to 90° C.

9. The method according to claim 1, wherein in step iv) the agarose coated porous support membrane is immersed in a water bath at a temperature ranging from 5-60° C.

10. The method according to claim 1, wherein in step i) a porous support membrane is provided having an average thickness between 100 μm-200 μm and an average pore size of 0.2 μm.

11. A method for making an agarose ultrafiltration membrane composite, comprising:
   i. providing a porous support membrane having an average pore size ranging from 0.01 μm to 10 μm and an average thickness ranging from 20 μm to 150 μm,
   ii. providing an agarose solution, wherein the agarose solution comprises a crosslinker at a concentration ranging from 0.01 wt.-% to 1 wt.-%,
   iii. casting a layer of the agarose solution onto the porous support membrane, wherein the agarose layer infiltrates the porous support membrane,
   iv. immersing the agarose coated porous support membrane into a water bath at a temperature below the gelling point of the agarose solution, wherein the agarose layer forms a hydrogel, and
   v. cooling the agarose coated porous support membrane, wherein an agarose ultrafiltration membrane composite having average pore size less than 0.1 μm is solidified, making an agarose ultrafiltration membrane composite.

* * * * *